United States Patent Office 2,924,048
Patented Feb. 9, 1960

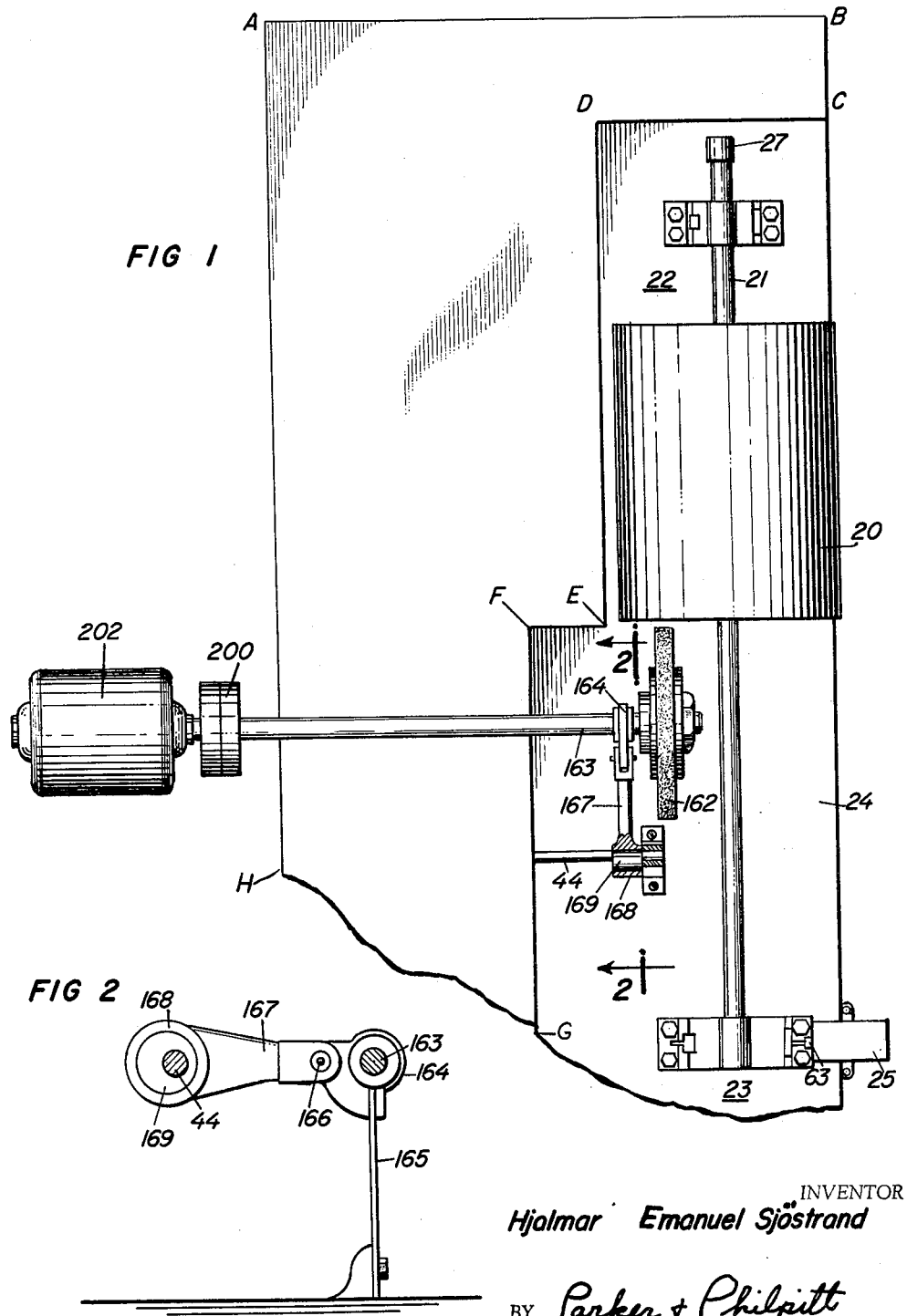

2,924,048

MACHINE FOR BALANCING ROTATABLE BODIES

Hjalmar Emanuel Sjöstrand, Saxdalen, Sweden

Application November 1, 1954, Serial No. 466,120

Claims priority, application Sweden November 5, 1953

1 Claim. (Cl. 51—165)

In my pending patent application Ser. No. 256,467, now U. S. Patent No. 2,731,887, issued on January 24, 1956, there is illustrated and described a number of embodiments of machines for automatically balancing rotatable bodies, which machines comprise a number of bearings for carrying the body to be balanced, means for rotating the body in the said bearings at a suitable speed, intermittently operating tools arranged to cooperate intermittently with the rotating body, and means actuated by the vibrations of the body for regulating the phase angle for the operating cycles of the tool with reference to the rotation cycles of the body in such a manner that the tool progressively diminishes the unbalance of the rotating body.

According to my said earlier patent the balancing tool may either consist of a milling cutter or other tool which removes material from the heavier side of the rotating body, or it may consist of a jet mechanism or other device by means of which molten metal, paint or other rapidly solidifying material can be delivered intermittently to the lightest side of the rotating body.

In said earlier patent there are also specified some embodiments of the devices serving to actuate the tool under control of the vibrations which the rotating body makes during the balancing operation. Thus the actuating device may comprise an electro-magnet or a relay the winding of which is intermittently supplied with current under control of the rotating body. According to another embodiment the tool may be positively controlled through the intermediary of a rotatable member, the rotation of which is dependent on the rotation of the body to be balanced.

The present invention relates to certain improvements in connection with the balancing tool used in balancing machines of the kind shown and specified in my said earlier patent.

A more detailed disclosure of the invention will now be given with reference to the attached drawing, in which:

Figure 1 is a fragmentary top view of a balancing arrangement wherein the novel components of the present invention are prominently illustrated and Figure 2 is a view along the lines 2—2 of Figure 1.

In Figure 1, I have attempted to clearly illustrate exactly how the present invention represents an improvement over my prior Patent No. 2,731,887. For example, it will be instantly recognized that elements numbered 20, 21, 22, 23, 25, 27, 44 and 63 in present Figure 1 correspond with elements bearing the same numbers in Figure 1 of Patent 2,731,887 and these numbered elements in Figure 1 of this application perform exactly the same function that they do in said patent. In Figure 1 of the present application, the area bounded by the letters A—B—C—D—E—F—G—H in "block-diagram" fashion correspond to the mechanisms in my Patent No. 2,731,887 which operate and synchronize the shaft 44 and the shaft 27. Stated in other words, U.S. Patent 2,731,887 describes a system for dynamically balancing rotatable bodies, such as rotors for electric motors, steam turbines, and the like. In Figure 1 of this patent, the rotatable body 20, from which the unbalance is to be removed, is secured on a shaft 21 which is in turn mounted for rotation in two pedestal bearings 22 and 23 which are supported on a base plate 24. The manner in which the shaft 21 is driven by a motor and a flexible intermediate shaft 27 is fully described. In the present invention, it is contemplated that exactly the same type of driving means be used. Also, in said patent an extension 44 of the rotor shaft of a synchronous motor is described in detail. The shaft 44 of the present invention corresponds exactly with the shaft 44 of said prior patent and furthermore the shaft 44 of the present invention is driven and synchronized in exactly the same manner as the shaft 44 of said prior patent. In the present drawing the shaft 44 is shown as terminated at the juncture of line F—G since the mechanical arrangement for operating 44 beyond this point is exactly the same as are shown in my said prior patent. Likewise, the shaft 27 is shown as terminated at the line D—C since the mechanical arrangement for operating this shaft beyond this point are exactly the same as are shown in my said prior patent. The use of the block-type diagram of area A—B—C—D—E—F—G—H was found to be desirable in order to avoid needless duplication of drawings covering exactly the same structures shown in U.S. Patent In Figure 1, there is shown a grinding wheel 162 which is adapted to intermittently engage the body to be balanced and which is mounted on a shaft 163, which is rotated with great speed by a separate motor 202. The shaft 163 is connected to its driving motor by a flexible coupling 200, or the like, so that it may swing towards and away from the body 20 to be balanced (which corresponds to the body 20 shown in my said previous patent). Close to grinding wheel 162 the shaft of grinding spindle 163 is guided in a bearing 164 located on the upper end of a flat spring 165, which is fixed by its lower end in the slide corresponding to carriage 40 in my said prior patent. The bearing 164 is joined to a link 167 by a pivot pin 166. At its outer end, the link 167 is shaped to form a bearing 168 for a circular disc 169 which is mounted eccentrically on a fixedly journaled horizontal shaft 44. The shaft 44 (which corresponds to the shaft 44 shown in Figures 1, 2, 5, 6 and 7 of my acknowledged prior patent) is driven synchronously with the shaft on which the body 20 (corresponding to 20 of my said previous patent) to be balanced is mounted, for example, either from a separate synchronous motor or through a gearing from the driving motor for the body 20. Similarly, to the manner of adjusting the shaft 44 of my said prior patent, the shaft 44 of the present application may then be adjusted in regard to its phase angle in relation to the shaft for the body 20 which is to be balanced.

The arrangement of the working tool in the manner shown in Figs. 1 and 2 would seem to be the most suitable one from the practical point of view. If the separate shaft 163 on which the grinding wheel 162 is located is driven from a separate motor, the braking of the grinding wheel in connection with its intermittent engagement with the body to be balanced does not have a disturbing effect on the rotation of the control shaft 44. The driving motor for the shaft 44, or the third shaft, may then be given any power desired and the grinding wheel may be rotated at a very high speed, so that the working tool may be used for the balancing of rotatable bodies of all diameters and all materials, even the hardest. If a high speed of rotation is selected, the grinding wheel may be made with a small diameter and thus with a small mass and inertia, so that the requisite control forces will be small.

Particularly in view of the small control forces required to bring a small grinding wheel 162, with the tool arrangement as per Fig. 1, in and out of engagement with the body 20 to be balanced, it is possible with a modified form of execution of this tool arrangement to replace with advantage the control shaft 44 by an oscillating tool operated electromagnetically, such as by an electro-magnet or relay, for example of the kind shown in Fig. 7 of my said prior patent.

I claim:

A device for moving a grinding wheel towards and away from a rotating body having a heavy side from which weight must be removed to bring it into dynamic balance, which comprises:

a bearing adjacent to said rotating body and flexibly mounted in such a manner that it can be reciprocated towards and away from said rotating body, a shaft journalled in said bearing, a rotary grinding wheel mounted for rotation on said shaft, a flexible coupling at one end of said shaft, stationary mounted means for rotating said shaft and said grinding wheel through said flexible coupling at weight-removing speed, said bearing, shaft and grinding wheel being so constructed and arranged that when said shaft is moved towards said rotating body the grinding wheel becomes operative to remove weight from said body, a second shaft rotatably mounted adjacent said bearing, means mounted on said second shaft and coupled with said bearing for reciprocating said bearing, said first shaft and said grinding wheel being movable only towards and away from said rotating body as said second shaft rotates, and means for rotating said second shaft in synchronism and in phase with said rotating body in such a manner that the grinding wheel is moved into operative position at the moment the heavy side of the rotating body faces the grinding wheel.

References Cited in the file of this patent

UNITED STATES PATENTS

| | | |
|---|---|---|
| 1,544,521 | Sosa | June 30, 1925 |
| 2,327,606 | Saltz | Aug. 24, 1943 |
| 2,346,975 | Laboulais | Apr. 18, 1944 |
| 2,474,883 | Zenor | July 5, 1949 |
| 2,731,887 | Sjostrand | Jan. 24, 1956 |